(12) United States Patent
Yamasaki et al.

(10) Patent No.: US 6,524,418 B2
(45) Date of Patent: Feb. 25, 2003

(54) METHOD OF PRODUCTION OF MULTILAYER OPTICAL RECORDING MEDIUM

(75) Inventors: Takeshi Yamasaki, Kanagawa (JP); Tomomi Yukumoto, Chiba (JP); Toshiyuki Kashiwagi, Tokyo (JP); Yuji Akiyama, Tokyo (JP); Eijiro Kikuno, Shizuoka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/907,370

(22) Filed: Jul. 17, 2001

(65) Prior Publication Data

US 2002/0043328 A1 Apr. 18, 2002

(30) Foreign Application Priority Data

Jul. 19, 2000 (JP) ......................... 2000-218646

(51) Int. Cl.[7] .................. B32B 31/20; B32B 15/08; B44C 1/165; G11B 3/70; G11B 7/26
(52) U.S. Cl. ............... 156/230; 156/233; 156/241; 156/247; 156/289; 428/64.4; 428/457; 428/914; 430/270.1; 430/495.1; 430/945; 369/283; 369/275.1; 204/192.26
(58) Field of Search ............... 156/230, 233, 156/234, 241, 379.8, 391, 247, 289; 428/64.1, 64.4, 457, 913, 914; 118/44, 135, 45, 56, 57, 208; 430/276.1, 495.1, 945; 369/117, 283, 288, 94, 275.1; 204/192.27, 192.15, 192.26

(56) References Cited

U.S. PATENT DOCUMENTS

| | | | | | |
|---|---|---|---|---|---|
| 5,846,627 A | * | 12/1998 | Hong | ......................... | 428/64.1 |
| 5,933,409 A | * | 8/1999 | Kato et al. | ............... | 369/275.1 |
| 6,117,284 A | * | 9/2000 | Mueller | ................. | 204/192.27 |

* cited by examiner

*Primary Examiner*—J. A. Lorengo
(74) *Attorney, Agent, or Firm*—Sonnenschein, Nath & Rosenthal

(57) ABSTRACT

A method of production of a multilayer optical recording medium capable of avoiding difficulties in separating a stamper and forming a semi-transparent film on a thin flexible film and a production method thereof, comprising steps of forming a first optical recording layer on a substrate formed with a pattern of irregularities for a first optical recording layer on a surface thereof, forming a transfer substrate comprised of an acrylic resin formed with a pattern of irregularities on a surface thereof, forming a second optical recording layer on the pattern of irregularities of the transfer substrate, adhering a flexible film at the upper portion of the second optical recording layer by an adhesive layer, separating the second optical recording layer and the transfer substrate at their boundary to transfer the second optical recording layer to the flexible film, and bonding together the first optical recording layer and the second optical recording layer with them facing each other.

11 Claims, 7 Drawing Sheets

METHOD OF PRODUCTION OF MULTILAYER OPTICAL RECORDING MEDIUM

RELATED APPLICATION DATA

The present application claims priority to Japanese Application No. P2000-218646 filed Jul. 19, 2000, which application is incorporated herein by reference to the extent permitted by law.

BACKGROUND OF THE INVENTION

1. Field of the Invention

The present invention relates to a method of production of a multilayer optical recording medium obtained by stacking a plurality of optical recording layers for optically recording information.

2. Description of the Related Art

Recently, in the field of information recording, studies on the method of optical information recording are underway everywhere. Optical information recording systems have numerous advantages such as the fact that non-contact recording and reading are possible, and it is possible to handle various forms of memories such as the reading-only type, write-once type, and rewritable type, etc. This system has broad potential applications from industrial to consumer use as a system able to realize inexpensive and large size files.

Among these, in particular, optical disks designed for use as reading-only type memories, that is, high density information recording media and optical video disks called "digital audio disks", "digital versatile disks", etc. have come into wide use.

This type of optical disk is configured by a transparent substrate formed with a pattern of irregularities such as pits to represent signal information and grooves, that is, an optical disk substrate, a reflection film comprised of an aluminum film or other metal thin film formed on the substrate, and a protection film for protecting the reflection film from moisture and oxygen in the air formed on the reflection film. When reading information of such an optical disk, for example, laser or other light for reading is focused on the pattern of irregularities from the optical disk substrate side and information is detected from the difference of reflectivity between the incident light and the returning light.

When producing such an optical disk, first, an optical disk substrate having the above pattern of irregularities is formed by a method such as injection molding, a reflection film comprised of a metal thin film is formed by vapor deposition or other method on this, and an ultraviolet light setting resin etc. is coated on this to form a protection film.

Recently, the demand for larger capacities of such optical disks has increased. To meet with this, an optical disk has been proposed which is obtained by forming a pattern of irregularities on one surface of the optical disk substrate, forming a semi-transparent film over this, forming a pattern of irregularities on this semi-transparent film separated by a distance of several 10s of $\mu$m, and forming a reflection film over this to thereby give a total of two optical recording layers.

The above optical disk having a plurality of optical recording layers has a large capacity and is expected to improve productivity and to be able to be produced easily.

As the method for the above, for example, there is the method of coating an ultraviolet light setting resin on a stamper having a pattern of irregularities, curing this by irradiating ultraviolet light while pressing a flexible film, then separating the stamper to transfer the pattern of irregularities to the ultraviolet light setting resin cured in a state bonded to the flexible film, forming a semi-transparent film on the pattern of irregularities of the obtained cured resin film to form the first stack having one optical recording layer, on the other hand, forming a substrate having a pattern of irregularities by injection molding, forming a reflection film on the obtained pattern of irregularities to similarly form the second stack having one optical recording layer, then bonding together the first stack and the second stack.

However, in the above conventional method of production of an optical disk having a plurality of optical recording layers, it is difficult to separate the stamper from the resin cured by irradiating the ultraviolet light, so there arise problems that burrs may occur on the cured resin or the resin may adhere on the stamper causing a reduced lifetime of the stamper.

In addition, in the step of forming a semi-transparent film on the cured resin film adhered on the flexible film, since a flexible film is used, it is not easy to handle. Therefore, there also arise problems that film formation is difficult and the flexible film becomes wrinkled during the film formation.

SUMMARY OF THE INVENTION

The present invention was made in consideration of this situation and has its object to provide a method of production of a multilayer optical recording medium able to be produced without the accompanying difficulty in separating a stamper and while avoiding the difficulties in forming a semi-transparent film etc. on a thin flexible film.

According to a first aspect of the present invention, there is provided a method of production of a multilayer optical recording medium comprises the steps of forming a first optical recording layer on a substrate formed with a pattern of irregularities, forming a transfer substrate comprised of an acrylic resin formed with a pattern of irregularities on a surface thereof, forming a second optical recording layer on the pattern of irregularities of the transfer substrate, adhering a flexible film at the upper portion of the second optical recording layer by an adhesive layer, separating the second optical recording layer and the transfer substrate at their boundary to transfer the second optical recording layer to the flexible film, and bonding together the first optical recording layer and the second optical recording layer with them facing each other.

In the method of production of a multilayer optical recording medium of the present invention, preferably the first optical recording layer is formed by a reflection film.

In the method of production of a multilayer optical recording medium of the present invention, preferably the second optical recording layer is formed by a semi-transparent film.

In the method of production of a multilayer optical recording medium of the present invention, preferably the second optical recording layer is formed by sputtering.

In the method of production of a multilayer optical recording medium of the present invention, preferably the second optical recording layer is made from a material including at least one of aluminum, silver, and silicon.

In the method of production of a multilayer optical recording medium of the present invention, a first optical recording layer is formed by a reflection film etc. on a substrate formed with a pattern of irregularities. On the other hand, a transfer substrate is formed which is comprised of an acrylic resin formed with a pattern of irregularities on a surface thereof. Next, a second optical recording layer is formed by a semi-transparent film, etc. on the pattern of irregularities of the transfer substrate. Next, a flexible film is adhered at the upper portion of the second optical recording layer by an adhesive layer. Next, the second optical recording layer and the transfer substrate are separated at their boundary to transfer the second optical recording layer to the flexible film. Next, the first optical recording layer and the second optical recording layer are bonded together with them facing each other.

Therefore, production is possible without requiring the step of separating a stamper from a resin cured by irradiating ultraviolet light and the step of forming a semi-transparent film on a thin flexible film. Production is possible without the accompanying difficulty in separating the stamper and while avoiding the difficulties in forming a semi-transparent film on a thin flexible film.

According to a second aspect of the present invention, there is provided a method of production of a multilayer optical recording medium comprises the steps of forming a first optical recording layer on a substrate formed with a pattern of irregularities, forming a first transfer substrate comprised of an acrylic resin formed with a pattern of irregularities on a surface thereof, forming a second optical recording layer on the pattern of irregularities of the first transfer substrate, adhering a flexible film at the upper portion of the second optical recording layer by an adhesive layer, separating the second optical recording layer and the first transfer substrate at their boundary to transfer the second optical recording layer to the flexible film, forming a second transfer substrate comprised of an acrylic resin formed with a pattern of irregularities on a surface thereof, forming a third optical recording layer on the pattern of irregularities of the second transfer substrate, bonding together the third optical recording layer and the first optical recording layer with them facing each other, separating the third optical recording layer and the second transfer substrate at their boundary to transfer the third optical recording layer onto the first optical recording layer, bonding together the second optical recording layer and the third optical recording layer with them facing each other.

In the method of production of a multilayer optical recording medium of the present invention, preferably the third optical recording layer is formed by a semi-transparent film.

In the method of production of a multilayer optical recording medium of the present invention, preferably after the step of transferring the third optical recording layer onto the first optical recording layer, steps of forming a transfer substrate comprised of an acrylic resin formed with a pattern of irregularities on a surface thereof, forming an optical recording layer on the pattern of irregularities of the transfer substrate, and adhering the optical recording layer by an adhesive layer to transfer the optical recording layer are repeated.

According to a third aspect of the present invention, there is provided a method of production of a multilayer optical recording medium comprises the steps of forming a first optical recording layer on a substrate formed with a pattern of irregularities, forming a first transfer substrate comprised of an acrylic resin formed with a pattern of irregularities on a surface thereof, forming a second optical recording layer on the pattern of irregularities of the first transfer substrate, adhering a flexible film at the upper portion of the second optical recording layer by an adhesive layer, separating the second optical recording layer and the first transfer substrate at their boundary to transfer the second optical recording layer to the flexible film, forming a second transfer substrate comprised of an acrylic resin formed with a pattern of irregularities on a surface thereof, forming a third optical recording layer on the pattern of irregularities of the second transfer substrate, bonding together the third optical recording layer and the second optical recording layer with them facing each other, separating the third optical recording layer and the second transfer substrate at their boundary to transfer the third optical recording layer onto the second optical recording layer, bonding together the first optical recording layer and the third optical recording layer with them facing each other.

In the method of production of a multilayer optical recording medium of the present invention, preferably the third optical recording layer is formed by a semi-transparent film.

In the method of production of a multilayer optical recording medium of the present invention, preferably after the step of transferring the third optical recording layer onto the first optical recording layer, steps of forming a transfer substrate comprised of an acrylic resin formed with a pattern of irregularities on a surface thereof, forming an optical recording layer on the pattern of irregularities of the transfer substrate, and adhering the optical recording layer by an adhesive layer to transfer the optical recording layer are repeated.

In the method of production of a multilayer optical recording medium of the present invention, a first optical recording layer is formed by a reflection film etc. on a substrate formed with a pattern of irregularities.

On the other hand, a first transfer substrate is formed which is comprised of an acrylic resin formed with a pattern of irregularities on a surface thereof. Next, a second optical recording layer is formed by a semi-transparent film, etc. on the pattern of irregularities of the first transfer substrate. Next, a flexible film is adhered at the upper portion of the second optical recording layer by an adhesive layer. Next, the second optical recording layer and the first transfer substrate are separated at their boundary to transfer the second optical recording layer to the flexible film.

Next, a second transfer substrate is formed which is comprised of an acrylic resin formed with a pattern of irregularities on a surface thereof. Next, a third optical recording layer is formed by a semi-transparent film etc. on the pattern of irregularities of the second transfer substrate. Next, the third optical recording layer is transferred onto the first or second optical recording layer.

Next, the third optical recording layer is bonded to the first or second optical recording layer together with them facing each other.

Therefore, when an optical disk having three optical recording layers is produced, therefore, production is possible without requiring the step of separating a stamper from a resin cured by irradiating ultraviolet light and the step of forming a semi-transparent film on a thin flexible film. Production is possible without the accompanying difficulty in separating the stamper and while avoiding the difficulties in forming a semi-transparent film on a thin flexible film.

Further, it is possible to produce an optical disk having four or more optical recording layers by repeating steps of forming a transfer substrate comprised of an acrylic resin formed with a pattern of irregularities on a surface thereof, forming an optical recording layer on the pattern of irregularities of the transfer substrate, and adhering the optical recording layer by an adhesive layer to transfer the optical recording layer after the step of transferring the third optical recording layer onto the first optical recording layer.

BRIEF DESCRIPTION OF THE DRAWINGS

These and other objects and features of the present invention will become clearer from the following description of the preferred embodiments given with reference to the accompanying drawings, in which:

FIGS. 2A and 2B are cross-sectional views of steps of a method of production of the multilayer optical recording medium according to the first embodiment, wherein FIG. 2A shows up to the step of forming a pattern of irregularities for a second optical recording layer on a transfer substrate and FIG. 2B shows up to the step of forming a second optical recording layer;

FIG. 3A shows up to the step of superimposing a flexible film and FIG. 3B shows up to the step of curing an adhesive;

FIG. 4A shows up to the step of separating a second optical recording layer from a transfer substrate and FIG. 4B shows up to the step of bonding a second stack and a first stack;

FIG. 6A shows up to the step of forming a pattern of irregularities for a third optical recording layer on a transfer substrate, FIG. 6B shows up to the step of forming a first stack, and FIG. 6c shows up to the step of superimposing a transfer substrate on the first stack; FIG. 7A shows up to the step of separating a third optical recording layer from a transfer substrate and FIG. 7B shows up to the step of bonding a second stack and a first stack adhered with a third optical recording layer.

DESCRIPTION OF THE PREFERRED EMBODIMENTS

Below, embodiments of the present invention will be described in detail with reference to the accompanying drawings.

First Embodiment

Figure 1:
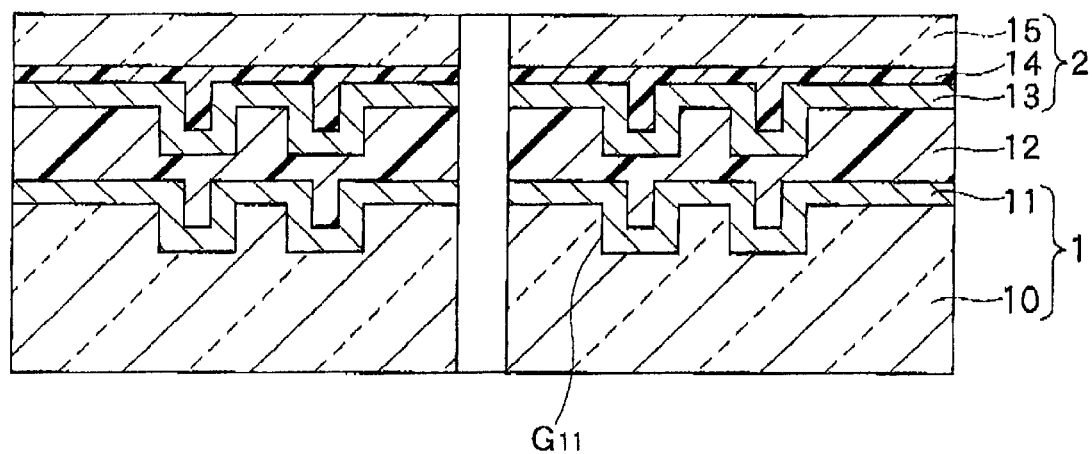
FIG. 1 is a cross-sectional view of a multilayer optical recording medium according to a first embodiment.

FIG. 1 is a cross-sectional view of a multilayer optical recording medium (also referred to as "an optical disk" hereinafter) according to the present embodiment.

A pattern of irregularities $G_{11}$ for a first optical recording layer is formed on a substrate 10 comprised of, for example, polycarbonate and having a thickness of about 1.1 mm. On top of this is formed a reflection film comprised of for example 15 nm thick aluminum and having a pattern corresponding to the above pattern of irregularities $G_{11}$, that is, the first optical recording layer 11. In this way, a first stack 1 is configured.

On the other hand, a semi-transparent film comprised of, for example, 8 nm thick aluminum and formed with a pattern of irregularities in other steps in advance, that is, a second optical recording layer 13, is adhered on a flexible film 15 comprised of for example polycarbonate and having a thickness of about 70 μm by an adhesive layer 14 such as an ultraviolet light setting resin. In this way, a second stack 2 is configured.

The first optical recording layer 11 and the second optical recording layer 13 are bonded together with them facing each other by an adhesive layer 12 such as a pressure-sensitive adhesive or an ultraviolet light setting resin-based adhesive. Here, the distance between the first optical recording layer 11 and the second optical recording layer 13 (that is, the thickness of the adhesive layer 12) is several 10s of μm (for example, 27 μm).

In this way, an optical disk according to the present embodiment is configured.

The above optical disk is used for example as a surface reading optical disk in which the second optical recording layer 13 and the first optical recording layer 11 are positioned in a range of depth of about 100 μm from the flexible film 15 side and the recorded information is read from the flexible film 15 side.

Next, the method of production of the above optical disk according to the present embodiment will be described with reference to the drawings.

Figure 2A:
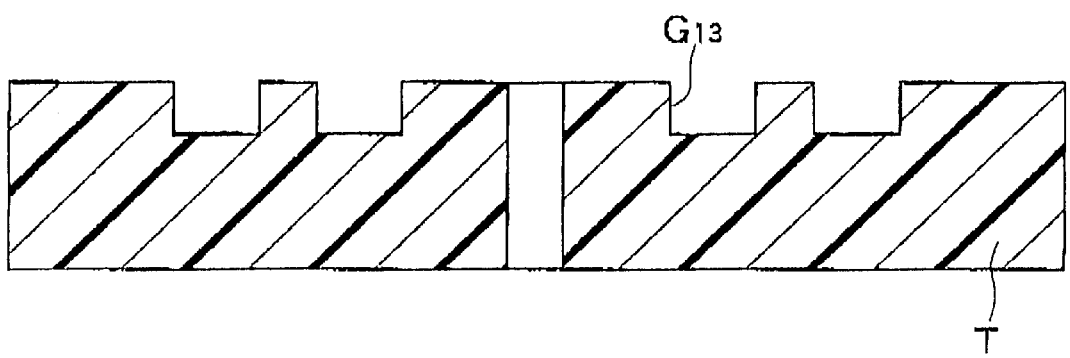

First, as shown in FIG. 2A, by for example injection molding etc., a transfer substrate T is formed which is comprised of an acrylic resin, having a thickness of for example 1.2 mm and formed with a pattern of irregularities $G_{13}$ for a second optical recording layer on a surface thereof.

Figure 2B:
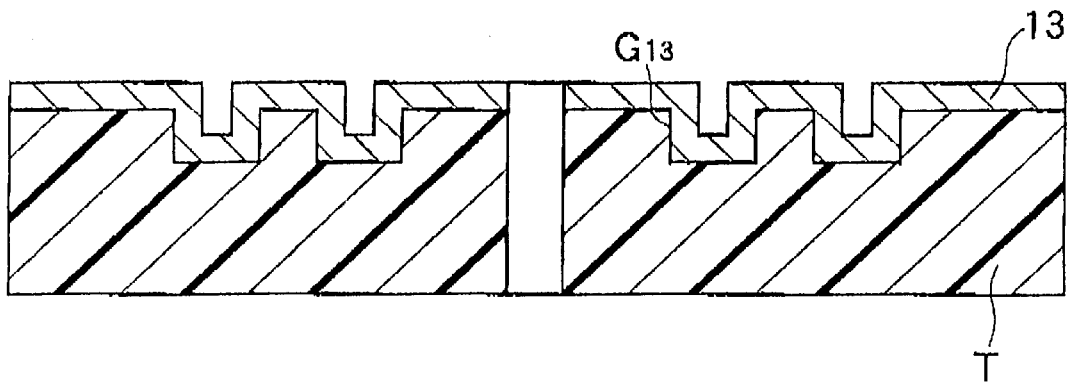

Next, as shown in FIG. 2B, aluminum, silver, or silicon is deposited to a thickness of, for example, 8 nm by for example sputtering on a transfer substrate T formed with the pattern of irregularities $G_{13}$ to form a semi-transparent film that has a pattern corresponding to the above pattern of irregularities $G_{13}$ that is, the second optical recording layer 13.

Figure 3A:
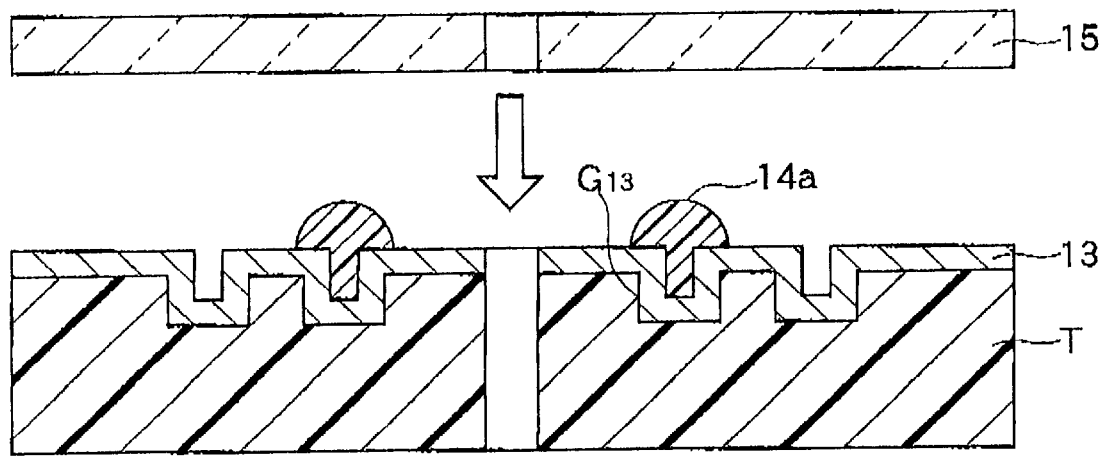
FIGS. 3A and 3B are cross-sectional views of the steps continuing from FIG. 2, where

Next, as shown in FIG. 3A, an ultraviolet light setting resin-based adhesive 14a is supplied onto the second optical recording layer 13 and flattened by spin coating etc. A flexible film 15 comprised of for example polycarbonate and having a thickness of about 70 μm is laid over the adhesive.

Figure 3B:
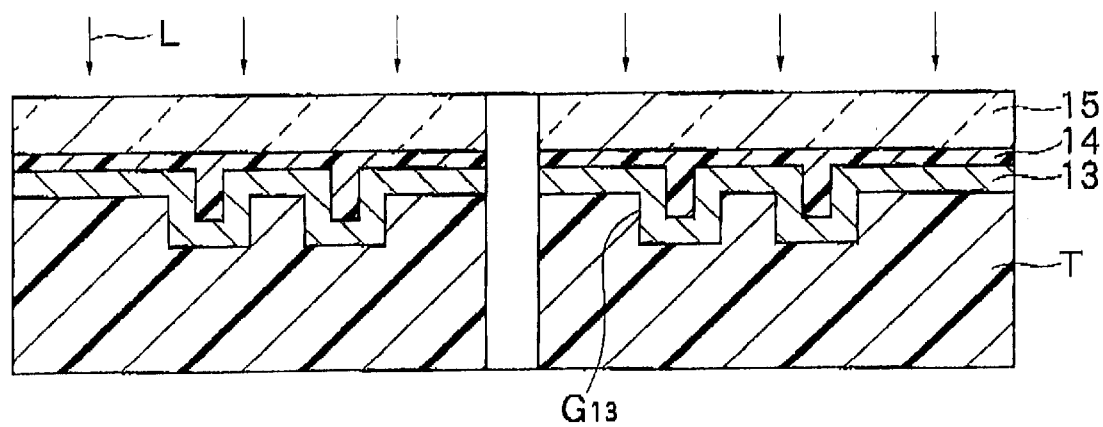

Next, as shown in FIG. 3B, ultraviolet light L is irradiated from the flexible film 15 side to cure the adhesive layer 14 and bond the flexible film 15 and the second optical recording layer 13.

Figure 4A:
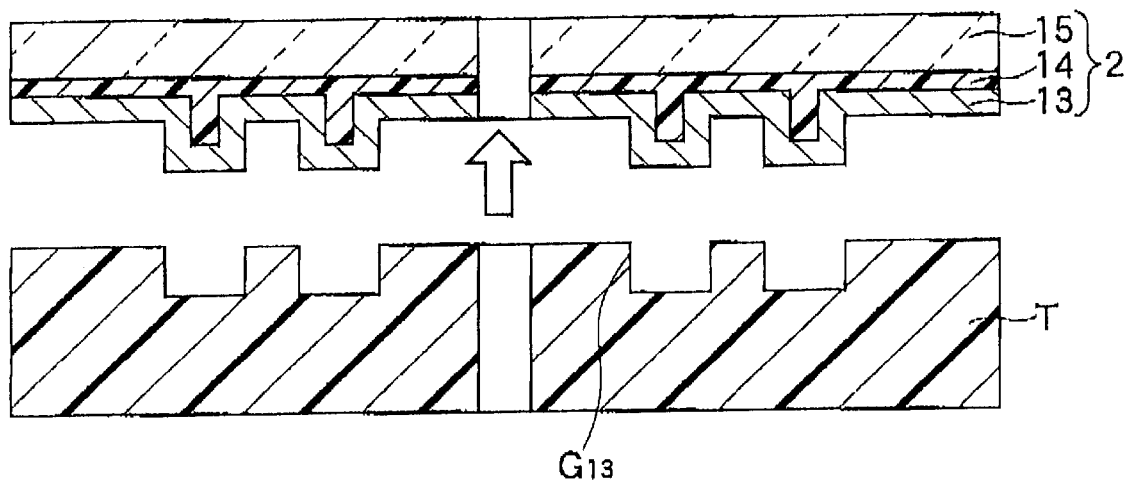
FIGS. 4A and 4B are cross-sectional views of the steps continuing from FIG. 3, where

Next, as shown in FIG. 4A, the second optical recording layer 13 and the transfer substrate T are separated at their boundary. Due to this, the second optical recording layer 13 is transferred to the flexible film 15 side and a second stack 2 is obtained configured with the second optical recording layer 13 bonded with the flexible film 15 by an adhesive layer 14.

The aluminum film formed on the transfer substrate T comprised of an acrylic resin by sputtering can be easily separated without damaging the aluminum film. Further, the flexible film 15 is pliable, which makes the separation easier.

Figure 4B:
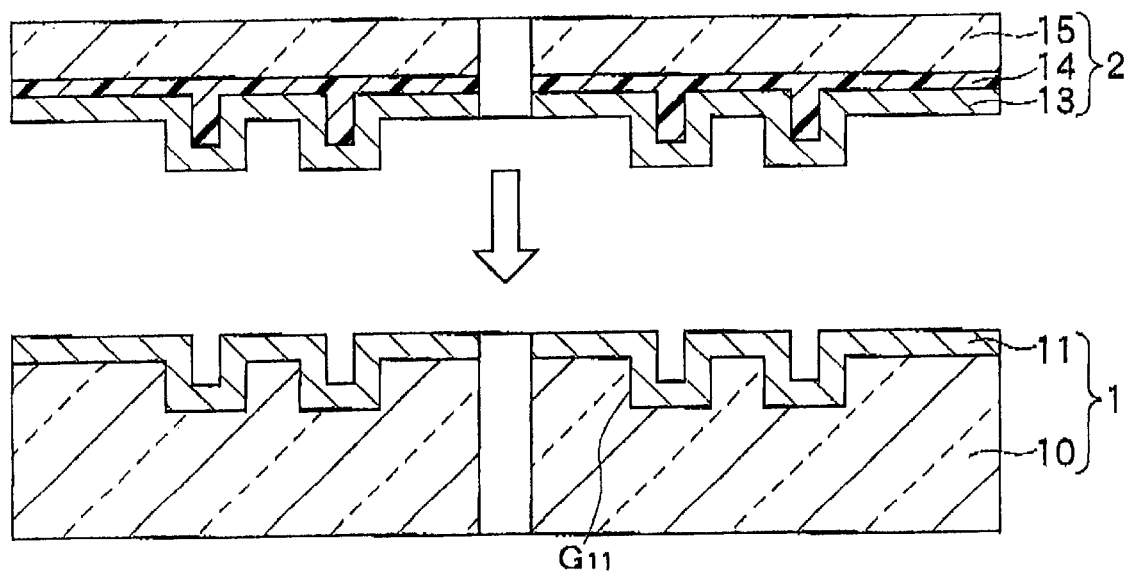

Next, as shown in FIG. 4B, the second stack 2 is bonded on the first stack 1 formed in advance by an adhesive layer 12 such as a pressure-sensitive adhesive or an ultraviolet light setting resin-based adhesive.

Here, the first stack is formed by forming a substrate 10 by for example injection molding etc., which is comprised of a polycarbonate ,having a thickness of for example 1.1 mm and formed with a pattern of irregularities $G_{11}$ for a first optical recording layer on a surface thereof, depositing aluminum to for example a thickness of 15 nm by for example sputtering on the top of this, and thereby forming a reflection film having a pattern corresponding to the above pattern of irregularities $G_{11}$, that is, the first optical recording layer 11.

In the step of bonding the second stack 2 and the first stack 1, the first optical recording layer 11 and the second optical recording layer are bonded in the state facing each other. Here, the distance between the first optical recording layer 11 and the second optical recording layer 13 (i.e., the thickness of the adhesive layer 12) is several 10s of $\mu$m (for example 27 $\mu$m).

In the above way, the optical disk as shown in FIG. 1 can be produced.

According to the method of production of an optical disk according to the present embodiment, the second optical recording layer comprised of a thin semi-transparent film can be easily transferred to the thin flexible film, so the production is possible without requiring the step of separating a stamper from a resin cured by irradiating ultraviolet light and the step of forming a semi-transparent film on a thin flexible film as in the conventional method. Therefore, production is possible without the accompanying difficulty in separating the stamper and while avoiding the difficulties in forming a semi-transparent film on a thin flexible film.

Second Embodiment

Figure 5:
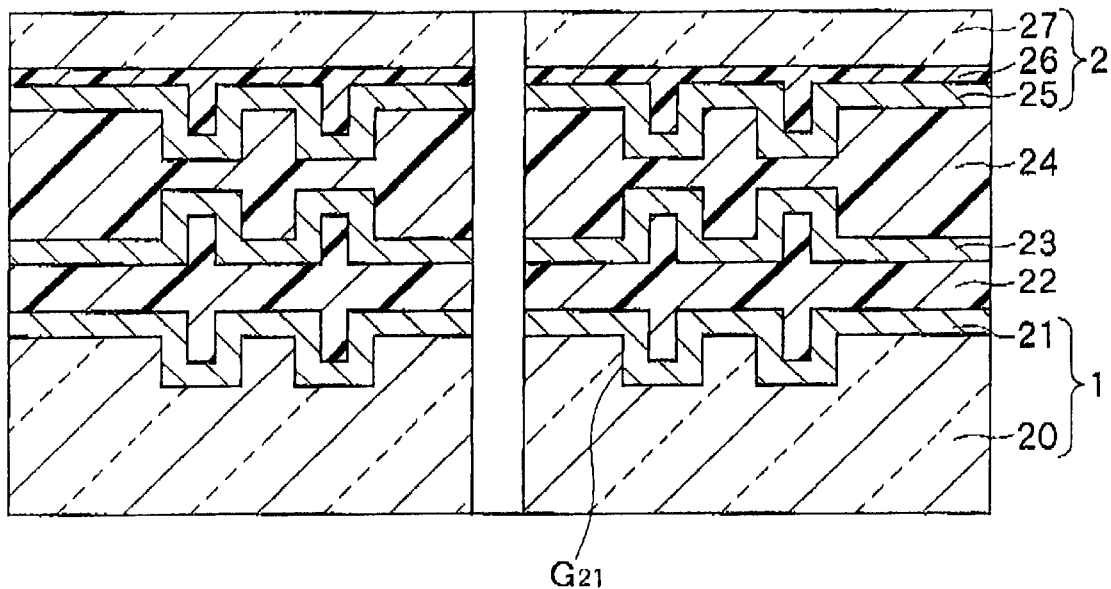
FIG. 5 is a cross-sectional view of a multilayer optical recording medium according to a second embodiment.

FIG. 5 is a cross-sectional view of an optical disk according to the present embodiment.

A pattern of irregularities $G_{21}$ for a first optical recording layer is formed on a substrate 20 comprised of for example polycarbonate and having a thickness of about 1.1 mm. On the top of this is formed, for example, a reflection film comprised of a 15 nm thick aluminum and having a pattern corresponding to the above pattern of irregularities $G_{21}$, that is, the first optical recording layer 21. In this way, a first stack 1 is configured.

A semi-transparent film comprised of for example 5 nm thick aluminum and formed with a pattern of irregularities in other steps in advance, that is, a third optical recording layer 23, is adhered on the top of the first optical recording layer 21 by an adhesive layer 22 such as an ultraviolet light setting resin.

On the other hand, a semi-transparent film comprised of for example 4 nm thick aluminum and formed with a pattern of irregularities in other steps in advance, that is, a second optical recording layer 25, is adhered on a flexible film 27 comprised of for example polycarbonate and having a thickness of a 50 $\mu$m or so by an adhesive layer 26 such as an ultraviolet light setting resin. In this way, a second stack 2 is configured.

The third optical recording layer 23 and the second optical recording layer 25 are bonded together with them facing each other by an adhesive layer 24 such as a pressure-sensitive adhesive or an ultraviolet light setting resin-based adhesive. Here, the distance between the first optical recording layer 21 and the third optical recording layer 23 (i.e.,.the thickness of the adhesive layer 22) and the distance between the third optical recording layer 23 and the second optical recording layer 25 (i.e., the thickness of the adhesive layer 24) are several 10s of $\mu$m (for example 25 $\mu$m), respectively.

In the above way, an optical disk having three optical recording layers according to the present embodiment is configured.

The above optical disk is used for example as a surface reading optical disk in which the first optical recording layer 21, the second optical recording layer 25, and the third optical recording layer 23 are positioned in a range of depth of about 100 $\mu$m from the flexible film 27 side and the recorded information is read from the flexible film 27 side.

Next, the method of production of the above optical disk according to the present embodiment will be described with reference to the drawings.

Figure 6A:
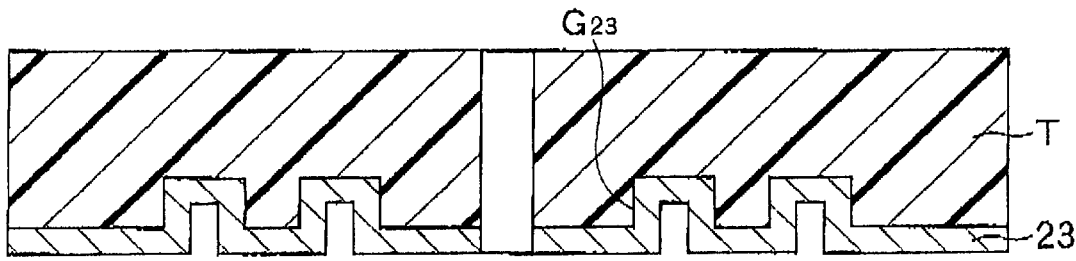
FIGS. 6A to 6C are cross-sectional views of steps of a method of production of the multilayer optical recording medium according to the second embodiment, where

First, as shown in FIG. 6A, by for example injection molding etc., a transfer substrate T is formed which is comprised of an acrylic resin, having a thickness of for example 1.1 mm and formed with a pattern of irregularities $G_{23}$ for a second optical recording layer on a surface thereof. Next, aluminum, silver, or silicon is deposited to a thickness of for example 5 nm by for example sputtering on the transfer substrate T formed with the pattern of irregularities $G_{23}$ to form a semi-transparent film that has a pattern corresponding to the above pattern of irregularities $G_{23}$, that is, the third optical recording layer 23.

Figure 6B:
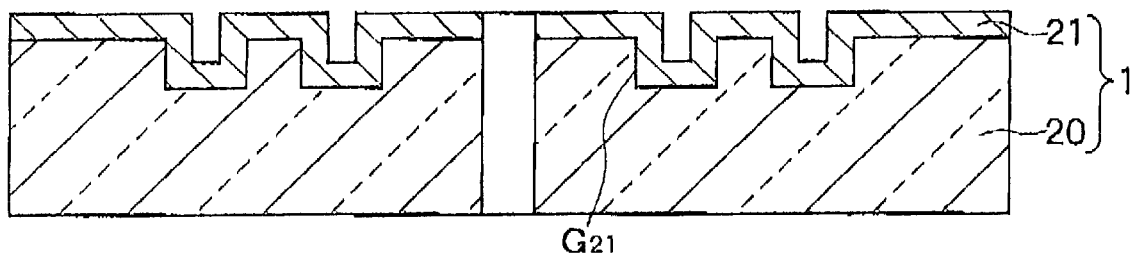

On the other hand, as shown in FIG. 6B, by for example injection molding etc., a substrate 20 is formed which is comprised of polycarbonate, having a thickness of for example 1.1 mm and formed with a pattern of irregularities $G_{21}$ for a first optical recording layer on a surface thereof. Next, aluminum etc. is deposited to a thickness of, for example, 15 nm by, for example, sputtering on the top of this to form a reflection film that has a pattern corresponding to the above pattern of irregularities $G_{21}$, that is, the first optical recording layer 21. In this way, the first stack 1 is configured.

Figure 6C:
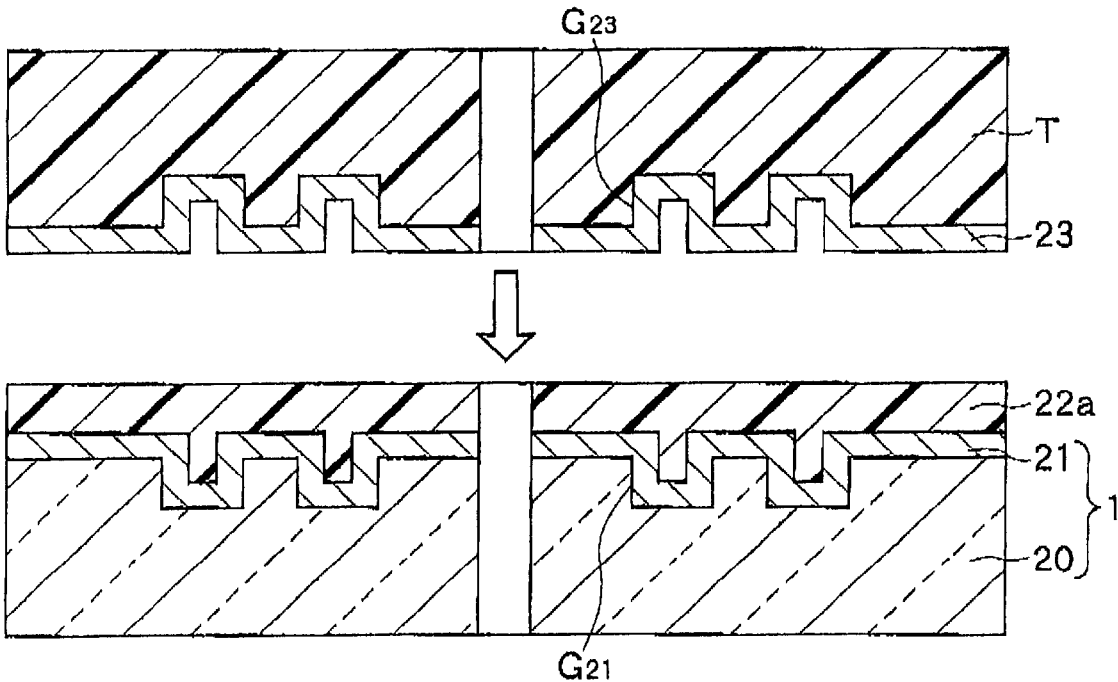

Next, as shown in FIG. 6C, an ultraviolet light setting resin-based adhesive 22a is supplied onto the first optical recording layer 21 and flattened by spin coating etc. The transfer substrate T formed with the third optical recording layer 23 is laid over the adhesive with the third optical recording layer 23 and the first optical recording layer 21 facing each other.

Figure 7A:
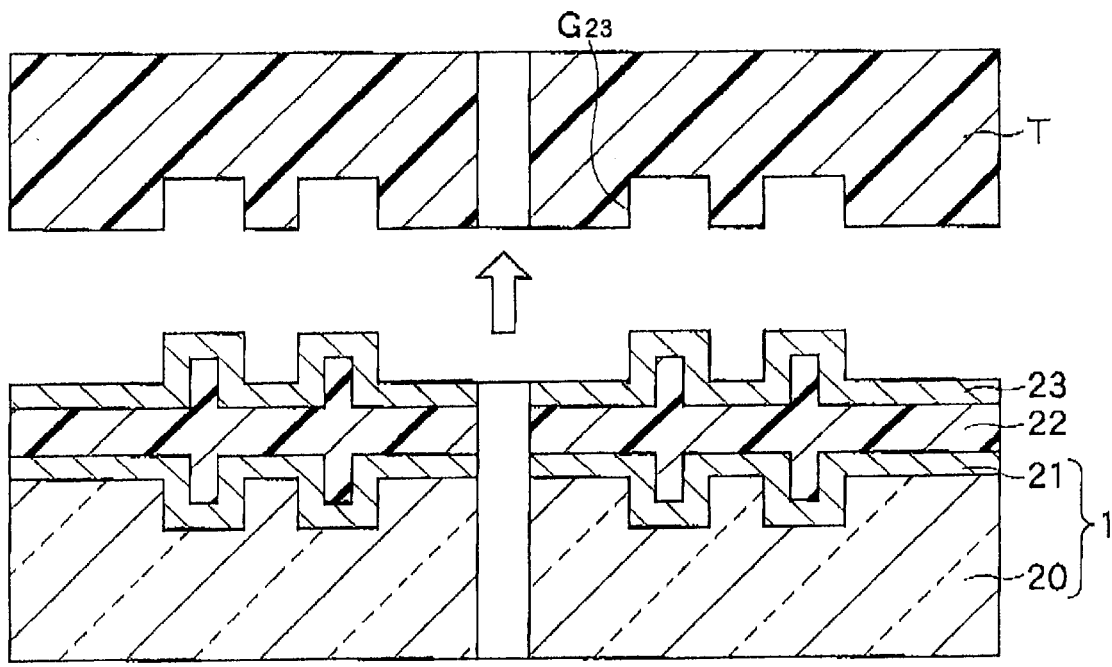
FIGS. 7A and 7B are cross-sectional views of the steps continuing from FIG. 6, where

Next, as shown in FIG. 7A, not illustrated ultraviolet light is irradiated from the transfer substrate T side to cure the adhesive layer 22 and bond the third optical recording layer 23 with the first optical recording layer 21, then the third optical recording layer 23 and the transfer substrate T are separated at their boundary. Due to this, the third optical recording layer 23 is transferred to the first stack 1 side. Here, the distance between the third optical recording layer 23 and the first optical recording layer 21 (i.e., the thickness of the adhesive layer 22) is several 10s of $\mu$m (for example 25 $\mu$m).

The aluminum film formed on the transfer substrate T comprised of an acrylic resin by sputtering can be easily separated without damaging the aluminum film.

Figure 7B:
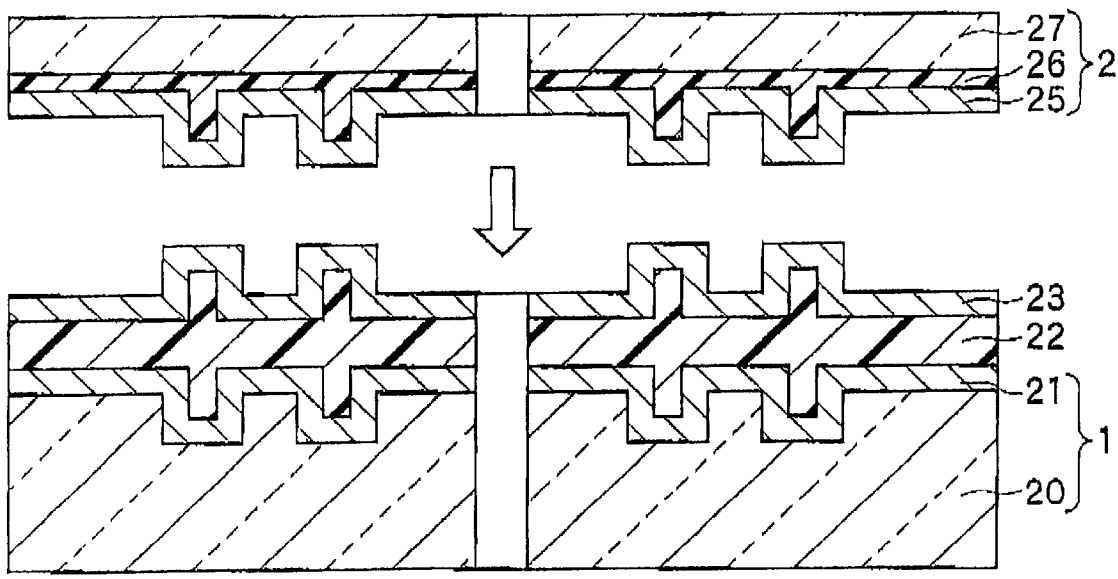

Next, as shown in FIG. 7B, the second stack 2 formed in advance is bonded on the first stack 1 adhered with the third optical recording layer 23 by the adhesive layer 24 such as a pressure-sensitive adhesive or an ultraviolet light setting resin-based adhesive.

Here, the second stack 2 can be formed in the same way as in the first embodiment.

That is, by for example injection molding etc., a transfer substrate is formed which is comprised of an acrylic resin, having a thickness of for example 1.1 mm and formed with a pattern of irregularities for a second optical recording layer on a surface thereof. Next, aluminum, silver, or silicon etc. is deposited to a thickness of for example 4 nm by for example sputtering on the transfer substrate T formed with the pattern of irregularities to form a semi-transparent film that has a pattern corresponding to the above pattern of irregularities, that is, the second optical recording layer 25. Next, an ultraviolet light setting resin-based adhesive is supplied onto the second optical recording layer 25 and flattened by spin coating, a flexible film 27 comprised of for example polycarbonate and having a thickness of 50 μm or so is superimposed on this. Next, ultraviolet light is irradiated from the flexible film 27 side to cure the adhesive layer 26. Then, the second optical recording layer 25 and the transfer substrate are separated at their boundary to obtain the second stack 2 of the above configuration.

In the step of bonding the second stack 2 to the first stack 1 adhered with the third optical recording layer 23, the third optical recording layer 23 and the second optical recording layer 25 are bonded together while facing each other. Here, the distance between the third optical recording layer 23 and the second optical recording layer 25 (i.e., the thickness of the adhesive layer 24) is several 10s of μm (for example 25 μm).

In the above way, the optical disk as shown in Fig. 5 can be produced.

According to the above method of production of an optical disk according to the present embodiment, the second or third optical recording layer comprised of the thin semi-transparent film can be easily transferred to the thin flexible film, so the step of separating a stamper from a resin cured by irradiating ultraviolet light and the step of forming a semi-transparent film on a thin flexible film as in the conventional method are not necessary. Therefore, production is possible without the accompanying difficulty in separating the stamper and while avoiding the difficulties in forming a semi-transparent film on a thin flexible film.

The above method of production of a multilayer optical recording medium according to the present embodiment is applicable to recording media including a plurality of optical recording layers regardless of the recording system.

The total number of optical recording layers is not particularly limited. For example, in the second embodiment, third optical recording layer may have a multilayer structure wherein optical recording layers are stacked via adhesive layers etc. In this case, all the intermediate optical recording layers are made semi-transparent films. Such multiple third optical recording layers can be formed, for example, in the second embodiment, by repeating the step of transfer an optical recording layer from the transfer substrate to the first stack.

In the above description, the third optical recording layer is transferred onto the first optical recording layer and the third optical recording layer and the second optical recording layer are bonded together, but it is possible that the third optical recording layer is transferred onto the second optical recording layer, and then, the third optical recording layer and the first optical recording layer are bonded together in order.

The present invention is not limited to the above embodiments.

For example, the materials, thicknesses, etc. of the substrate, optical recording layers, adhesive layer between layers, etc. which form the multilayer optical recording medium are not limited to those described in the above embodiments and can be suitably selected.

Numerous other modifications can also be made to an extent not changing the gist of the present invention.

According to the method of production of the multilayer optical recording medium of the present invention, the step of separating a stamper from a resin cured by irradiating ultraviolet light and the step of forming a semi-transparent film on a thin flexible film are not required and therefore production is possible without the accompanying difficulty in separating the stamper and while avoiding the difficulties in forming a semi-transparent film on a thin flexible film.

While the invention has been described with reference to specific embodiment chosen for purpose of illustration, it should be apparent that numerous modifications could be made thereto by those skilled in the art without departing from the basic concept and scope of the invention.

What is claimed is:

1. A method of production of a multilayer optical recording medium having a flexible film side through which a laser light is irradiated for reproducing information on said medium, said method comprising the steps of:
   forming a first optical recording layer on a substrate formed with a pattern of irregularities,
   forming a transfer substrate comprised of an acrylic resin formed with a pattern of irregularities on a surface thereof,
   forming a second optical recording layer on the pattern of irregularities of the transfer substrate,
   adhering a flexible film at the upper portion of the second optical recording layer by an adhesive layer,
   separating the second optical recording layer and the transfer substrate at their boundary to transfer the second optical recording layer to the flexible film, and
   bonding together the first optical recording layer and the second optical recording layer with them facing each other.

2. A method of production of a multilayer optical recording medium as set forth in claim 1, wherein the first optical recording layer is formed by a reflection film.

3. A method of production of a multilayer optical recording medium as set forth in claim 1, wherein the second optical recording layer is formed by a semi-transparent film.

4. A method of production of a multilayer optical recording medium as set forth in claim 1, wherein the second optical recording layer is formed by sputtering.

5. A method of production of a multilayer optical recording medium as set forth in claim 1, wherein the second optical recording layer is made from a material including at least one of aluminum, silver, and silicon.

6. A method of production of a multilayer optical recording medium, comprising the steps of:
   forming a first optical recording layer on a substrate formed with a pattern of irregularities,
   forming a first transfer substrate comprised of an acrylic resin formed with a pattern of irregularities on a surface thereof,
   forming a second optical recording layer on the pattern of irregularities of the first transfer substrate,
   adhering a flexible film at the upper portion of the second optical recording layer by an adhesive layer,
   separating the second optical recording layer and the first transfer substrate at their boundary to transfer the second optical recording layer to the flexible film,
   forming a second transfer substrate comprised of an acrylic resin formed with a pattern of irregularities on a surface thereof,
   forming a third optical recording layer on the pattern of irregularities of the second transfer substrate,
   bonding together the third optical recording layer and the first optical recording layer with them facing each other, separating the third optical recording layer and the second transfer substrate at their boundary to transfer the third optical recording layer onto the first optical recording layer, bonding together the second optical recording layer and the third optical recording layer with them facing each other.

7. A method of production of a multilayer optical recording medium as set forth in claim 6, wherein the third optical recording layer is formed by a semi-transparent film.

8. A method of production of a multilayer optical recording medium as set forth in claim 6, wherein after the step of transferring the third optical recording layer onto the first optical recording layer, steps of forming a transfer substrate comprised of an acrylic resin formed with a pattern of irregularities on a surface thereof, forming an optical recording layer on the pattern of irregularities of the transfer substrate, and adhering the optical recording layer by an adhesive layer to transfer the optical recording layer are repeated.

9. A method of production of a multilayer optical recording medium, comprising the steps of:

forming a first optical recording layer on a substrate formed with a pattern of irregularities, forming a first transfer substrate comprised of an acrylic resin formed with a pattern of irregularities on a surface thereof, forming a second optical recording layer on the pattern of irregularities of the first transfer substrate, adhering a flexible film at the upper portion of the second optical recording layer by an adhesive layer, separating the second optical recording layer and the first transfer substrate at their boundary to transfer the second optical recording layer to the flexible film, forming a second transfer substrate comprised of an acrylic resin formed with a pattern of irregularities on a surface thereof, forming a third optical recording layer on the pattern of irregularities of the second transfer substrate, bonding together the third optical recording layer and the second optical recording layer with them facing each other, separating the third optical recording layer and the second transfer substrate at their boundary to transfer the third optical recording layer onto the second optical recording layer, bonding together the first optical recording layer and the third optical recording layer with them facing each other.

10. A method of production of a multilayer optical recording medium as set forth in claim 9, wherein the third optical recording layer is formed by a semi-transparent film.

11. A method of production of a multilayer optical recording medium as set forth in claim 9, wherein after the step of transferring the third optical recording layer onto the first optical recording layer, steps of forming a transfer substrate comprised of an acrylic resin formed with a pattern of irregularities on a surface thereof, forming an optical recording layer on the pattern of irregularities of the transfer substrate, and adhering the optical recording layer by an adhesive layer to transfer the optical recording layer are repeated.

* * * * *